United States Patent
Liu et al.

(10) Patent No.: US 9,238,461 B1
(45) Date of Patent: Jan. 19, 2016

(54) OUTPUT BUMP MANAGEMENT IN A STRONG HYBRID VEHICLE

(71) Applicant: GM GLOBAL TECHNOLOGY OPERATIONS LLC, Detroit, MI (US)

(72) Inventors: Chia-Shang Liu, Ann Arbor, MI (US); Shaochun Ye, Northville, MI (US); Robert L. Morris, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/454,967

(22) Filed: Aug. 8, 2014

(51) Int. Cl.
*B60L 11/00* (2006.01)
*B60K 1/00* (2006.01)
*B60W 20/00* (2006.01)
*B60L 15/20* (2006.01)

(52) U.S. Cl.
CPC .............. *B60W 20/108* (2013.01); *B60L 15/20* (2013.01); *Y10S 903/902* (2013.01)

(58) Field of Classification Search
CPC .............. B60K 6/445; B60L 2240/423; B60L 2240/486; B60W 10/08; B60W 10/105; B60W 20/00; B60W 2510/0241; B60W 2510/025; B60W 2510/102; B60W 2710/083; F16H 2061/6603; Y02T 10/6239; Y02T 10/642
USPC ...................... 701/22, 35, 208, 211, 213, 300; 180/65.21, 65.1–65.8; 340/995.1, 340/995.19
See application file for complete search history.

(56) References Cited

U.S. PATENT DOCUMENTS

| | | | | |
|---|---|---|---|---|
| 5,738,605 A | * | 4/1998 | Fliearman | F16H 61/10 477/108 |
| 8,617,027 B2 | * | 12/2013 | Stoffels | B60K 6/442 477/3 |
| 2005/0096819 A1 | * | 5/2005 | Keyse | F16H 61/061 701/51 |
| 2006/0116236 A1 | * | 6/2006 | Trush | F16H 61/143 477/62 |
| 2007/0179695 A1 | * | 8/2007 | Reinke | B60W 10/06 701/54 |
| 2008/0257619 A1 | * | 10/2008 | Yamazaki | B60K 6/44 180/65.265 |
| 2008/0262667 A1 | * | 10/2008 | Otabe | B60W 10/06 701/22 |
| 2012/0190498 A1 | * | 7/2012 | Stoffels | B60K 6/442 477/5 |

* cited by examiner

*Primary Examiner* — Muhammad Shafi
(74) *Attorney, Agent, or Firm* — Quinn Law Group, PLLC

(57) ABSTRACT

A method for managing output bump/clunk in a neutral state in a strong hybrid vehicle includes calculating a motor torque for an electric traction motor connected to a third node of a planetary gear set. The motor torque is calculated as a product of a predetermined inertia of the electric traction motor, the calculated acceleration of the engine, and a gear ratio of the planetary gear set. The calculated motor torque is commanded from the electric traction motor via a controller in a direction opposite the calculated acceleration of the output shaft, including transmitting a motor torque command to the electric traction motor for the duration of the neutral state. The vehicle includes the engine, a damper assembly, the transmission, and the controller.

20 Claims, 1 Drawing Sheet

OUTPUT BUMP MANAGEMENT IN A STRONG HYBRID VEHICLE

TECHNICAL FIELD

The present disclosure relates to the management of driveline output bump in a strong hybrid vehicle.

BACKGROUND

Strong hybrid vehicles use an internal combustion engine and one or more electric traction motors to provide input torque to gear sets of a transmission. The available modes of a strong hybrid may therefore include an engine-only mode, one or more electric-only/electric vehicle modes, and multiple hybrid or electrically variable transmission modes. In some strong hybrid designs, there is no method for opening the mechanical path between the engine and an output shaft of the transmission. Neutral is achieved in such designs by counter rotating one of the electric traction motors at idle to nullify engine speed. This is known as "geared neutral". As a result, a condition referred to as driveline output bump may result when operating the transmission in neutral due to transient torque disturbances from the engine. The terms "output bump" and "clunk" are conventionally used in the art to describe the perceived sound and/or feel of any undesirable engine output torque oscillations.

SUMMARY

A method is disclosed herein for managing output bump/clunk in a strong hybrid vehicle having an engine, a transmission, and a controller. The transmission includes an input member, an output member, and a planetary gear set. The method includes calculating a motor torque for an electric traction motor connected to a third node of the planetary gear set. The motor torque is calculated as a product of a predetermined inertia of the electric traction motor, a calculated acceleration of an output shaft of the engine, and a gear ratio of the planetary gear set, or an equivalent planetary gear set when multiple gear sets are used. The method also includes commanding the calculated motor torque from the electric traction motor via the controller in a direction opposite the calculated acceleration of the output shaft, including transmitting a motor torque command to the electric traction motor for the duration of the neutral state.

A system is also disclosed that includes the transmission and the controller.

A strong hybrid vehicle includes an engine having an output shaft. The vehicle also includes a damper assembly, a transmission, and a controller. The transmission includes an input member, an output member, at least one planetary gear set, and an electric traction motor. The controller, which is in communication with the transmission, includes a processor and memory on which is recorded instructions for managing output bump or clunk during neutral. Execution of the instructions causes the controller to perform the steps of the method noted above.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
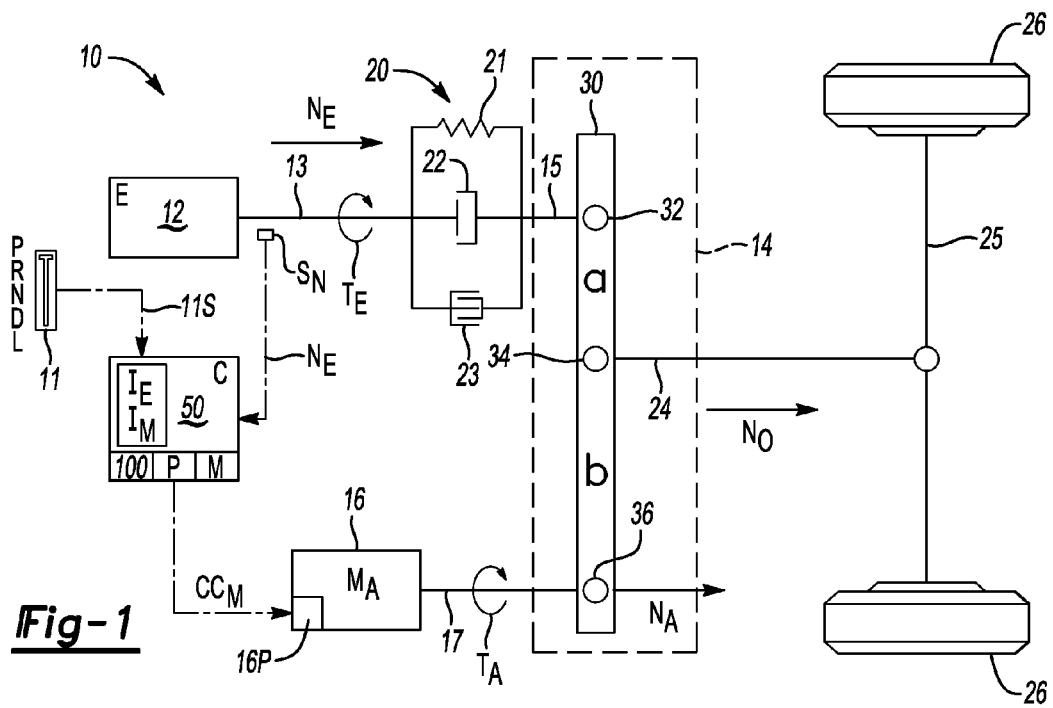
FIG. 1 is a schematic illustration of an example strong hybrid vehicle having a controller programmed to manage driveline output bump or clunk when operating in neutral.

Referring to the Figures, an example vehicle 10 is shown in FIG. 1 having an internal combustion engine (E) 12, a transmission 14, and a controller (C) 50. The vehicle 10 is a strong hybrid electric vehicle. That is, the transmission 14 is connected to or includes multiple sources of possible input torque, including the engine 12 and an electric traction motor 16 ($M_A$). Additional electric traction motors may be used as part of the transmission 14 without departing from the untended inventive scope.

The transmission 14 is shown in schematic lever diagram format to include a planetary gear set 30. As is well known in the art, multiple interconnected gear sets of a transmission may be reduced schematically to a single equivalent gear set as shown in FIG. 1. Therefore, the depiction of a single planetary gear set in FIG. 1 does not limit the present approach to transmissions having only one planetary gear set.

Figure 2:
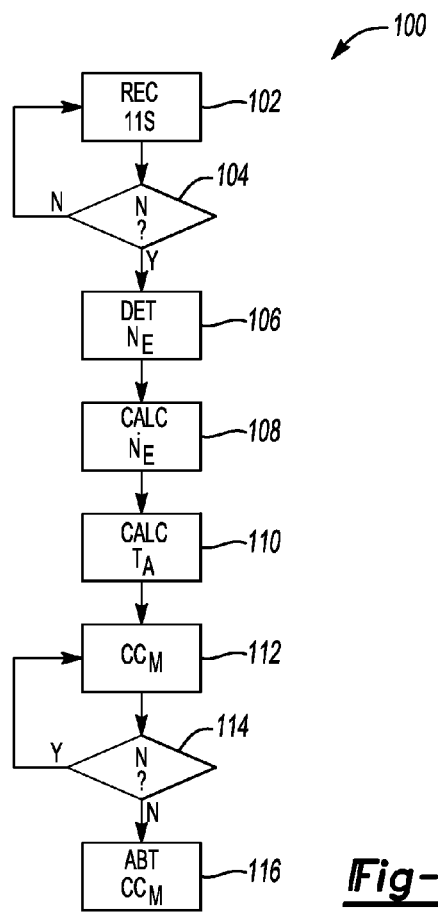
FIG. 2 is a flow chart describing an example method for managing driveline output bump or clunk in the vehicle shown in FIG. 1.

The controller 50 is programmed to manage a condition referred to as output "bump" or "clunk" whenever the transmission 14 is operating in a neutral state. To this end, the controller 50 is operable for selectively executing instructions embodying a method 100, an example of which is shown in FIG. 2 and described below. In executing the method 100, the controller 50 activates the electric traction motor 16 by selectively delivering an engine speed-based motor torque command (arrow $CC_M$) to a motor control processor 16P of the electric traction motor 16. The electric traction motor 16, e.g., a relatively high-voltage, polyphase electric machine in the form of a motor/generator unit, responds to the motor torque command (arrow $CC_M$) by cancelling engine disturbances for the duration of the neutral state.

The controller 50 may be embodied as a digital computer having a processor P and memory M. The memory M includes sufficient amounts of tangible, non-transitory memory, e.g., read only memory (ROM), flash memory, optical and/or magnetic memory, electrically-programmable read only memory (EPROM), and the like. Memory M also includes sufficient transient memory such as random access memory (RAM), electronic buffers. Hardware of the controller 50 includes a high-speed clock, analog-to-digital (A/D) and digital-to-analog (D/A) circuitry, and input/output (I/O) circuitry and devices, as well as appropriate signal conditioning and buffer circuitry.

In the example transmission 14 of FIG. 1, the planetary gear set 30 includes first, second, and third nodes 32, 34, and 36, respectively. Such nodes may be configured in one possible embodiment as respective ring gear, carrier member, and sun gear, without being limited to such a design. The engine 12 includes an output shaft 13 that rotates at engine speed (arrow $N_E$) with an engine torque (arrow $T_E$). The output shaft 13 may be selectively connected to an input member 15 of the transmission 14 at the first node 32 via actuation of a damper assembly 20. The damper assembly 20 is represented schematically in FIG. 1 as a spring 21 and a damper 22. A bypass lockup clutch 23 may be used to rigidly connect the engine 12 to the transmission 14 as needed, for instance during engine start/stop events.

The approach described herein is independent of the damper assembly 20. In order to ensure that a reaction disturbance torque is not imposed on the first node 32, there should be no difference in speed or acceleration between the first node 32 and the engine 12. Per equation (5) as set forth below, the electric traction motor 16 will control the first node 32 so that the first node 32 has the same speed and acceleration as the engine 12. In other words, the design described herein will work for a vehicle 10 having the damper assembly 20 or a rigid connection (not shown) between the engine 12 and the first node 32.

Further with respect to the vehicle 10, the transmission 14 includes an output member 24 that is connected to the second node 34. The output member 24 rotates with an output speed (arrow $N_O$). The output member 24 transmits an output torque (arrow $T_O$) to drive axle(s) 25, and ultimately to a set of drive wheels 26 to propel the vehicle 10. The electric traction motor 16 is connected to the third node 36 via an interconnecting member 17 rotating at a motor speed (arrow $N_A$). The electric traction motor 16 ultimately delivers a motor torque ($T_A$) to the planetary gear set 30 at the third node 36.

Still referring to FIG. 1, the controller 50 is programmed with predetermined inertia values $I_E$ and $I_M$ for the engine 12 and the electric traction motor 16, respectively. The lengths a and b denoted on the schematic planetary gear set 30 represent the lengths from the output member 24 at the second node 34 to the respective first and third nodes 32 and 36. Such lengths may be considered in terms of a number of gear teeth of each gear elements embodying the various nodes 32, 34, and 36, and are therefore used by the controller 50 to determine gear ratios during control of the transmission 14.

The vehicle 10 includes a park, reverse, neutral, drive, low (PRNDL) input device 11 of the type known in the art. The PRNDL input device 11 may be conventional, such as a cable-actuated gear shift lever, or it may be by-wire/electrically-actuated push-button device. In either case, a PRNDL valve (not shown) connected to the transmission 14 moves in response to movement of the PRNDL device to shift the transmission 14 into the requested PRNDL mode. As part of the method 100, the controller 50 receives a PRNDL signal (arrow 11S) describing the position of the PRNDL input device 11, or of the controlled PRNDL valve (not shown), and is thus informed of the state or position of the PRNDL input device 11. The controller 50 also receives the engine speed (arrow $N_E$), e.g., as measured at the output shaft 13 via a speed sensor $S_N$ in the embodiment of FIG. 1, or alternatively as reported to the controller 50 by a separate engine control module (not shown), calculated, or modeled/estimated.

The controller 50 of FIG. 1 is programmed to calculate the acceleration of the engine 12, with the acceleration represented below as $\dot{N}_E$, upon receipt, estimation, or other determination of the engine speed (arrow $N_E$). At steady-state idle conditions of the engine 12 when the transmission 14 is in a neutral state, engine acceleration should be zero, i.e., $\dot{N}_E=0$. According to the equivalent/simplified planetary gear arrangement shown in FIG. 1, this condition implies that motor acceleration and acceleration of the output member 24 of the transmission 14 are also zero, i.e., $\dot{N}_A=\dot{N}_O=0$. However, due to torque disturbances from the engine 12 when the transmission 14 is operating in neutral, acceleration of the engine 12 and of the electric traction motor 16 will tend to vary from zero. Any non-zero motor accelerations will in turn induce an inertia reaction torque of the electric traction motor 16 that is transmitted through the planetary gear set 30 to the output member 24. The result of this inertia torque transmission is output bump or clunk, which if severe enough may be perceived by an occupant of the vehicle 10 as driveline noise, vibration, and harshness.

Drive Dynamics Equations

Neglecting damper and friction forces for simplicity, the Coriolis forces and centrifugal acceleration present in the driveline will be constrained by the planetary gear set 30. Therefore, only tangential acceleration is considered in the following equations (1)-(6). The following equation is obtained from the lever diagram of the transmission 14 shown in FIG. 1:

$$\frac{(\dot{N}_O - \dot{N}_E)}{(\dot{N}_A - \dot{N}_O)} = \frac{b}{a} \qquad (1)$$

The force balance equation is as follows:

$$T_E+T_O+T_A-I_A-I_E\dot{N}_E=0 \qquad (2)$$

The moment balance at the first node 32 of the planetary gear set 30 is defined as:

$$(T_A-I_A\dot{N}_A)\times(a+b)+T_O\times a=0 \qquad (3)$$

Design of Motor Torque

Since the objective of the present design is to ensure zero torque and no acceleration of the output member 24, the desired output acceleration and torque should both be zero. From equation (1) above, assuming that $\dot{N}_O=0$, the desired acceleration of motor 16 is described as:

$$\dot{N}_{ADsrd}=-\dot{N}_E\times b/a \qquad (4)$$

From equations (3) and (4), and assuming that $T_O=0$, the desired motor to be output from electric traction motor 16 is as follows:

$$T_A=I_A\dot{N}_{ADsrd}=-I_A\times\dot{N}_E\times b/a \qquad (5)$$

From equations (2), (4), and (5) above, it can be seen that if the desired conditions of $\dot{N}_O=0$ and $\dot{T}_O=0$ are satisfied, engine torque ($T_E$) should be as follows:

$$T_E=I_E\dot{N}_E \qquad (6)$$

From equations (5) and (6), in order to have an output torque of zero the engine 12 and the electric traction motor 16 must produce sufficient torque to balance their own inertia-resistant torques. In other words, no torque transfer can occur between the engine 12 and the electric traction motor 16. As a result, the motor torque command (arrow $CC_M$) for control of the electric traction motor 16 determined per equation (5) above may be selectively implemented by the controller 50 to eliminate driveline clunk or bump whenever the transmission 14 is in a neutral state.

Referring to FIG. 2, an example embodiment of the method 100 begins with step 102. The controller 50 of FIG. 1 receives the PRNDL signal (arrow 11S) or otherwise measures or determines the present commanded position of the PRNDL input device 11 or of a PRNDL valve (not shown) controlled by the PRNDL input device 11. The method 100 proceeds to step 104 once the requested state of the transmission 14 is known.

Step 104 entails determining whether the present state of the transmission 14 determined at step 102 is a neutral state. If not, step 102 is repeated. The method 100 proceeds to step 106 when the controller 50 has verified that the transmission 14 is operating in the neutral state.

At step 106, the controller 50 next determines the present engine speed ($N_E$). In the example configuration shown in FIG. 1, the speed sensor $S_N$ is positioned with respect to the output shaft 13 to directly measure the engine speed ($N_E$). In other approaches, the controller 50 may receive the engine speed ($N_E$) as a reported value, such as from an engine control module (not shown), or engine speed ($N_E$) may be estimated or modeled using a state machine as is known in the art. The method 100 proceeds to step 108 when engine speed ($N_E$) is known.

Step 108 includes calculating, via the controller 50, the acceleration $\dot{N}_E$ of the engine 12, i.e., the rate of change in the rotational speed of the output shaft 13 shown in FIG. 1. The value of the calculated engine acceleration $\dot{N}_E$ is temporarily recorded in memory M of the controller 50 before the method 100 continues to step 110.

Step 110 includes calculating the required motor torque from the electric traction motor 16. Step 110 may entail solving equation (5) above via the controller 50. That is, as $T_A = -I_A \times \dot{N}_E \times b/a$, and as the values for motor inertia $I_A$ and lengths a and b are known to the controller 50, the result of step 108, i.e., the calculated engine acceleration $\dot{N}_E$, is all that is required to determine the necessary torque value to be commanded.

The motor torque $T_A$ calculated at step 110 is then applied at step 112 via transmission of the motor torque command (arrow $CC_M$) to the motor control processor 16P. Step 110 may be tuned to provide the desired transition, and thus feel, of any application of the motor torque $T_A$ to third node 36. That is, the motor torque $T_A$ may be simply commanded on upon entering neutral. Alternatively, the motor torque $T_A$ may be ramped on over a calibrated duration to smooth the transition, thereby making the onset of the motor torque $T_A$ less noticeable to the driver. The method 100 then proceeds to step 114.

At step 114, the controller 50 determines whether the PRNDL input device 11 is still in neutral. As with step 104, this may entail processing the PRNDL signal (arrow 11S) or otherwise verifying the setting of the PRNDL input device 11. Steps 112 and 114 are repeated until the driver of the vehicle 10 shifts the transmission 14 out of neutral, at which point the method 100 proceeds to step 116.

Step 116 entails aborting the motor torque command (arrow $CC_M$) applied at step 112. Step 116 may include commanding the motor torque $T_A$ off instantaneously upon leaving the neutral state. Alternatively, the motor torque $T_A$ may be ramped off over a calibrated duration as in step 114 so as to smooth the transition, thereby making the discontinuation of the motor torque $T_A$ less noticeable to the driver. That is, discontinuing the motor torque $T_A$ may occur gradually according to a calibrated ramp profile, e.g., at the same rate or a different rate than that used in applying the motor torque $T_A$ in step 112. The method 100 is then finished.

Using the method 100, the controller 50 selectively applies motor torque $T_A$ from the electric traction motor 16 to the planetary gear set 30 to actively respond to the inertia reaction of the electric traction motor 16 to any engine torque disturbances while operating in neutral. The method 100 is intended to help eliminate output bump/clunk in neutral. Such an advantageous result can be achieved even with relatively large oscillations in engine speed (arrow $N_E$) provided the motor torque command (arrow $CC_M$) remains within the capacity of the electric traction motor 16. Moreover, as engine acceleration is used at step 110 instead of the acceleration of the electric traction motor 16, phase delay and other issues are avoided.

While the best modes for carrying out the disclosure have been described in detail, those familiar with the art to which this disclosure relates will recognize various alternative designs and embodiments for practicing the disclosure within the scope of the appended claims.

The invention claimed is:

1. A method for managing output bump or clunk in a hybrid vehicle having an engine, a transmission having an input member connected to the engine, an output member, and at least one planetary gear set, and a controller, the method comprising:
   calculating, via the controller, an acceleration of an output shaft of the engine when the transmission is in a neutral state, wherein the output shaft of the engine is connected to a first node of the planetary gear set in the neutral state of the transmission, and wherein the output member of the transmission is continuously connected to a second node of the planetary gear set;
   calculating, via the controller, a motor torque for an electric traction motor connected to a third node of the planetary gear set as a product of a predetermined inertia of the electric traction motor, the calculated acceleration of the engine, and a gear ratio of the planetary gear set; and
   managing the output bump or clunk by commanding the calculated motor torque from the electric traction motor via the controller in a direction opposite to the calculated acceleration of the output shaft, including transmitting a motor torque command to the electric traction motor for a duration of the neutral state.

2. The method of claim 1, further comprising directly measuring a speed of the output shaft via a sensor and transmitting the measured speed to the controller.

3. The method of claim 2, further comprising calculating the acceleration of the output shaft as a rate of change of the measured speed.

4. The method of claim 1, wherein the first node is a ring gear, the second node is a carrier member, and the third node is a sun gear.

5. The method of claim 1, wherein commanding the calculated motor torque occurs instantaneously upon entering the neutral state.

6. The method of claim 1, wherein commanding the calculated motor torque occurs gradually according to a calibrated ramp profile.

7. The method of claim 6, further comprising detecting when the transmission exits the neutral state and gradually discontinuing the motor torque command according to another calibrated ramp profile.

8. A system for use in a hybrid vehicle having an engine with an output shaft, comprising:
   a transmission having an input member, an output member, and at least one planetary gear set; and
   a controller in communication with the transmission, wherein the controller includes a processor and memory on which is recorded instructions for managing output bump or clunk in the transmission, wherein execution of the instructions causes the controller to:
   calculate an acceleration of the output shaft of the engine via the controller when the transmission is in a neutral state, wherein the output shaft of the engine is connected to a first node of the planetary gear set in the neutral state, and wherein the output member is continuously connected to a second node of the planetary gear set;
   calculate a motor torque for an electric traction motor connected to a third node of the planetary gear, via the controller, set as a product of a predetermined inertia of the electric traction motor, the calculated acceleration of the engine, and a gear ratio of the planetary gear set; and
   manage the output bump or clunk by commanding the calculated motor torque from the electric traction motor via the controller in a direction opposite to the calculated acceleration of the output shaft, including transmitting a motor torque command to the electric traction motor for a duration of the neutral state.

9. The system of claim 8, further comprising a speed sensor positioned with respect to the output shaft that is operable for measuring a speed of the output shaft and transmitting the measured speed to the controller, wherein the controller is programmed to calculate the acceleration of the output shaft as a rate of change of the measured speed.

10. The system of claim 8, wherein the first node is a ring gear, the second node is a carrier member, and the third node is a sun gear.

11. The system of claim 8, wherein the controller is programmed to command the calculated motor torque instantaneously upon entering the neutral state.

12. The system of claim 8, wherein the controller is programmed to command the calculated motor torque gradually according to a calibrated ramp profile.

13. The system of claim 8, wherein the controller is programmed to detect when the transmission exits the neutral state, including by processing a park, reverse, neutral, drive, low (PRNDL) signal, and then discontinuing the motor torque command.

14. A hybrid vehicle comprising:
an engine having an output shaft;
a transmission having an input member, an output member, an electric traction motor, and at least one planetary gear set;
a controller in communication with the transmission, wherein the controller includes a processor and memory on which is recorded instructions for managing output bump or clunk in the transmission, wherein execution of the instructions causes the controller to:
calculate an acceleration of the output shaft of the engine when the transmission is in the neutral state, wherein the output shaft of the engine is connected to a first node of the planetary gear set in the neutral state and the output member is continuously connected to a second node of the planetary gear set;
calculate a motor torque to be output by the electric traction motor, which is directly connected to a third node of the planetary gear set, as a product of a predetermined inertia of the electric traction motor, the calculated acceleration of the engine, and a gear ratio of the planetary gear set; and
manage the output bump or clunk by commanding the calculated motor torque from the electric traction motor in a direction opposite to the calculated acceleration of the output shaft, including transmitting a motor torque command to the electric traction motor for a duration of the neutral state.

15. The vehicle of claim 14, further comprising a speed sensor positioned with respect to the output shaft that is operable for measuring a speed of the output shaft of the engine and transmitting the measured speed to the controller, wherein the controller is programmed to calculate the acceleration of the output shaft as a rate of change of the received measured speed.

16. The vehicle of claim 14, wherein the first node is a ring gear, the second node is a carrier member, and the third node is a sun gear.

17. The vehicle of claim 14, wherein the controller is programmed to command the calculated motor torque occurs instantaneously upon entering the neutral state.

18. The vehicle of claim 14, wherein the controller is programmed to command the calculated motor torque gradually according to a calibrated ramp profile.

19. The vehicle of claim 18, wherein the controller is programmed to discontinue application of the calculated motor torque gradually according to the calibrated ramp profile.

20. The vehicle of claim 14, further comprising a park, reverse, neutral, drive, low (PRNDL) input device, wherein the controller is programmed to detect when the transmission enters or exits the neutral state by processing a PRNDL signal indicating a position of the PRNDL input device.

* * * * *